United States Patent Office 3,325,499
Patented June 13, 1967

3,325,499
1-(1-HYDROCARBYL-4-PIPERDYL)-2-INDOLINONE
George Ireland Poos, Ambler, Pa., assignor to
McNeil Laboratories, Incorporated, a corporation of Pennsylvania
No Drawing. Filed Nov. 2, 1964, Ser. No. 408,345
4 Claims. (Cl. 260—294)

This invention relates to a new series of compounds. More particularly, it concerns certain substituted oxindole compounds which may be represented by the formula

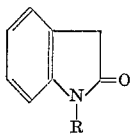

and the nontoxic, therapeutically active acid addition salts thereof.

In the above formula, R stands for piperidyl or phenyl-loweralkylpiperidyl.

As used herein, loweralkyl may be straight or branch chained and have from 1 to 4 carbon atoms, such as, for example, methyl, ethyl, propyl, isopropyl, butyl, isobutyl, tertiary butyl and the like.

The compound of the structure represented by the formula wherein R is 1-benzyl-4-piperidyl is prepared by reacting 4-N-amino-1-benzylpiperidine with a halo acetyl halide such as chloroacetyl chloride in the presence of a base. The haloacetylation is carried out in water or in an organic solvent such as an alcohol or an inert organic solvent such as benzene, toluene, xylene, an ether such as dioxane or diethylether or a chlorinated hydrocarbon solvent such as ethylene dichloride, chloroform or methylene chloride. Alkaline metal or alkaline earth metal, hydroxides, carbonates or acetates may be used as the base. In the preferred method, chloroacetyl chloride is reacted with the 4-N-anilino-1-benzylpiperidine in the presence of sodium hydroxide in a mixture of water and methylene chloride. The resulting 2-halo-N-(1-benzylpiperidyl)-N-phenyl acetamide is then cyclized under Friedel-Crafts reaction conditions. Catalysts for this reaction include boron trifluoride, hydrogen fluoride, anhydrous aluminum bromide or preferably anhydrous aluminum chloride. The cyclization reaction is carried out in an organic solvent such as carbon disulfide or, in the absence of a solvent, by heating the halo acetamide directly with the catalyst. In the preferred method, 2-chloro-N-(1-benzylpiperidyl)-N-phenyl acetamide is mixed with anhydrous aluminum chloride and the mixture is heated. The resulting 1-(1-benzyl-4-piperidyl)-2-indolinone is hydrogenolized with hydrogen in the presence of a catalyst and solvent. Suitable catalyst for the hydrogenolysis reaction are platinum oxide, ruthenium, rhodium, palladium or, preferably, palladium-on-carbon. The hydrogenolysis reaction is carried out in a suitable organic solvent such as a lower alkanol, for example, methanol, ethanol, 2-propanol, or in an ester such as ethyl acetate or butyl acetate, or in an organic acid such as propionic acid or preferably, acetic acid. The resulting 1-(4-piperidyl)-2-indolinone is then alkylated with a phenyl lower alkyl halide or sulfate in the presence of a base to produce the corresponding 1-(1-phenyl-lower-alkyl-4-piperidyl)-2-indolinone. The alkylation reaction is advantageously carried out at elevated temperatures in a suitable high boiling organic solvent such as dioxane, butyl alcohol, ethylene glycol, monomethyl ether and, preferably, methyl isobutyl ketone. The base employed is an alkali metal or alkaline earth metal, carbonate, bicarbonate or acetate such as potassium carbonate, sodium bicarbonate, lithium acetate or calcium carbonate, preferably sodium carbonate.

The subject compounds may be isolated as the free bases by synthetic processes normally employed. These compounds in base form are convertible to therapeutically active non-toxic acid addition salts by treatment with an appropriate acid, for example, an inorganic acid such as hydrohalic acid; e.g., hydrochloric, hydrobromic, hydroiodic; sulfuric or nitric acid; a phosphoric acid; an organic acid such as acetic, propionic, glycolic, lactic, pyruvic, malonic, succinic, maleic, fumaric, malic, tartaric, citric, benzoic, cinnamic, mandelic, methane sulfonic, ethane sulfonic, benzene sulfonic, salicylic, para-amino salicylic, 2-phenoxy benzoic or 2-acetoxy benzoic acid. Conversely, the salt form can be converted in the usual manner into the free base.

The compounds of this invention absorb ultra violet light and are useful as sun-screening materials in salves and ointments. In addition because of their solubility in organic materials generally, they may be used as ultra violet absorbers in plastics and resins, such as polystyrene, polyethylene, polypropylene, polyacrylics (methacrylate resins, polyacylamides, polyacrylonitrile fibers), polyamide fibers (nylon, e.g.), and polyester fibers. In the latter use the inclusion of 0.01 to 5 percent of the absorber, based on the polymer weight, is sufficient to render protection against ultraviolet light, such as in plastic film or light filters. The absorber may be incorporated in the mixture of monomers before polymerization to form the polymer or it may be incorporated at any stage during its handling, as by milling into the polymer together with other compounding ingredients or during the spinning of polymers into fibers, etc.

The compounds of this invention also show pharmacological activity in animals, such as analgesic activity.

The following examples are intended to illustrate, but not to limit, the scope of the invention.

EXAMPLE I

A solution of 50.0 g. of 4-N-anilino-1-benzylpiperidine in 300 ml. of methylene chloride is mixed with 200 ml. of 15 percent aqueous sodium hydroxide and the mixture is stirred and cooled in an ice-bath. To this mixture is added with stirring a solution of 23.7 g. of chloroacetyl chloride in 200 ml. of methylene chloride. The mixture is stirred for 1 hour and allowed to warm to room temperature after the addition. The layers are separated and the aqueous phase is washed with methylene chloride. The combined organic solution is dried over anhydrous magnesium sulfate, filtered and concentrated to dryness to give 62.3 g. of solid product, M.P. 79–106° C. One recrystallization from ethyl acetate gives crystalline product melting at 110.5–113.5° C. For characterization, a portion of this product is converted to the acid fumarate. The pure 2-chloro-N-(1-benzylpiperidyl)-N-phenyl acetamide fumarate melts at 167–168° C., after recrystallization from alcohol ether.

A mixture of 54.6 g. of 2-chloro-N-(1-benzylpiperidyl)-N-phenyl acetamide and 64.0 g. of anhydrous aluminum chloride are mixed in a flask by rapid stirring. A metal bath at 130° C. is raised around the flask. The solid mixture melts, becomes less mobile, darkens and becomes liquid again as a rapid evolution of gas occurs. The mixture is heated for 5 minutes and the dark liquid is poured into a porecelain dish. Upon cooling, the liquid hardens and is ground up throughly and added carefully to a large volume of ice and water. The resultant dark liquid is collected, suspended in water and the water is made strongly basic. The aqueous suspension is extracted thoroughly with methylene chloride. The organic solution is dried, filtered and concentrated to dryness giving 23.1 g. of dark, oily product. This oil is converted to the fumarate. The crude salt is washed with ether, yielding a tan solid which is purified by recrystallization from dimethylformamide to give pure 1-(1-benzyl-4-piperidyl)-2-indolinone fumarate, M.P. 228–229° C. After liberation from its fumarate and recrystallization from ethyl acetate, pure 1-(1-benzyl-4-piperidyl)-2-indolinone is obtained melting at 103.5–105° C.

EXAMPLE II

A solution of 30.95 g. of 1-(1-benzyl-4-piperidyl)-2-indolinone in 200 ml. of glacial acetic acid containing 1.0 g. of 10 percent palladium on charcoal catalyst is hydrogenated at 50° C. under low hydrogen pressure for 15 hours. The catalyst is separated by filtration and the reaction solution is concentrated to dryness under vacuum. The residue is dissolved in water and the solution is made basic with diluted sodium hydroxide and extracted three times with methylene chloride. The methylene chloride solution is dried over anhydrous magnesium sulfate, filtered and concentrated to dryness. Trituration of the residue with ether gives solid product melting at 122.5–140° C. Purification by treatment with neutral alumina and recrystallization from isopropyl alcohol provides pure 1-(4-piperidyl)-2-indolinone, M.P. 165–169° C. U.V. absorption in methanol: 252 m$\mu$($\epsilon$8,920).

EXAMPLE III

A mixture of 1.95 g. of 1-(4-piperidyl)-2-indolinone, 1.6 g. of sodium carbonate, a few crystals of potassium iodide and 50 ml. of methyl isobutyl ketone is heated under reflux and a small portion is distilled to remove water. Phenethyl bromide (1.85 g.) is then added and the mixture is heated under reflux for 45 hours. Dilute hydrochloric acid is added and a solid is removed by filtration. The solid is suspended in dilute sodium hydroxide solution an the acetic filtrate from above is added. The total mixture is made basic with sodium hydroxide and extracted with ether and methylene chloride. The combined organic portions are dried over anhydrous magnesium sulfate, filtered and concentrated to dryness to give crude product, M.P. 144–149° C. Purification by recrystallization from ethyl acetate, ethanol and 2-propanol provides 1-(1-phenethyl-4-piperidyl)-2-indolinone melting at 155.5–156° C. U.V. absorption in methanol: 253 m$\mu$($\epsilon$9,340).

What is claimed is:
1. A member of the group consisting of substituted oxindoles having the formula

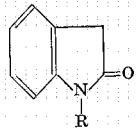

wherein R is a member selected from the group consisting of piperidyl and phenyl-loweralkylpiperidyl, and the nontoxic, therapeutically active acid addition salts thereof.
2. 1-(1-benzyl-4-piperidyl)-2-indolinone.
3. 1-(4-piperidyl)-2-indolinone.
4. 1-(1-phenethyl-4-piperidyl)-2-indolinone.

No references cited.

WALTER A. MODANCE, *Primary Examiner.*
AVROM D. SPEVACK, *Assistant Examiner.*